United States Patent [19]
Streater

[11] 3,849,704
[45] Nov. 19, 1974

[54] LIGHTNING ARRESTOR
[75] Inventor: August L. Streater, Bluffton, Ind.
[73] Assignee: Franklin Electric Co., Inc., Bluffton, Ind.
[22] Filed: Oct. 27, 1972
[21] Appl. No.: 301,629

[52] U.S. Cl. ................................ 317/13 R, 317/65
[51] Int. Cl. ........................... H02h 7/08, H02h 1/04
[58] Field of Search ............ 317/13 R, 51, 61.5, 62; 310/71, 68 C, 86; 337/28, 34

[56] References Cited
UNITED STATES PATENTS

| | | | |
|---|---|---|---|
| 2,155,841 | 4/1939 | Rorden | 317/14 B |
| 2,628,322 | 2/1953 | Yonkers | 317/65 |
| 2,698,911 | 1/1955 | Schaefer | 310/86 |
| 3,048,722 | 8/1962 | Baron | 310/72 |
| 3,319,096 | 5/1967 | Eberhart | 310/71 |
| 3,435,290 | 3/1969 | Lyman | 317/13 R |
| 3,469,047 | 9/1969 | Berg | 337/28 |
| 3,522,570 | 8/1970 | Wanaselja | 337/34 |
| 3,604,964 | 9/1971 | Conrad | 310/71 |
| 3,649,874 | 3/1972 | Peche | 317/62 |

Primary Examiner—J. D. Miller
Assistant Examiner—Patrick R. Salie
Attorney, Agent, or Firm—Hibben, Noyes & Bicknell

[57] ABSTRACT

A lightning arrestor comprising an electrode and gas-generating, arc extinguishing material contained within a closed casing is provided for use within a submersible electric motor. The lightning arrestor is located within the motor and is grounded directly to the housing of the submerged motor.

9 Claims, 10 Drawing Figures

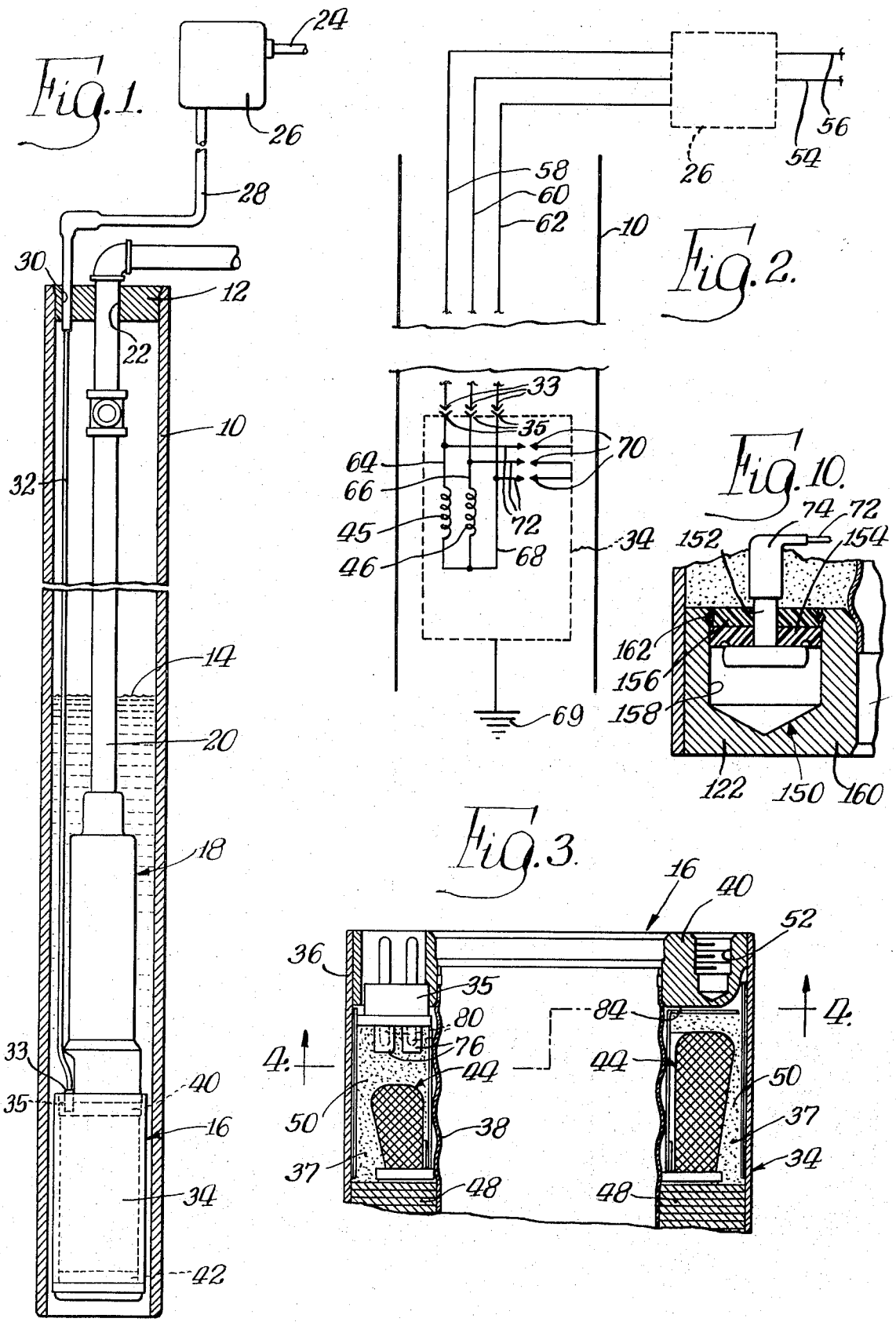

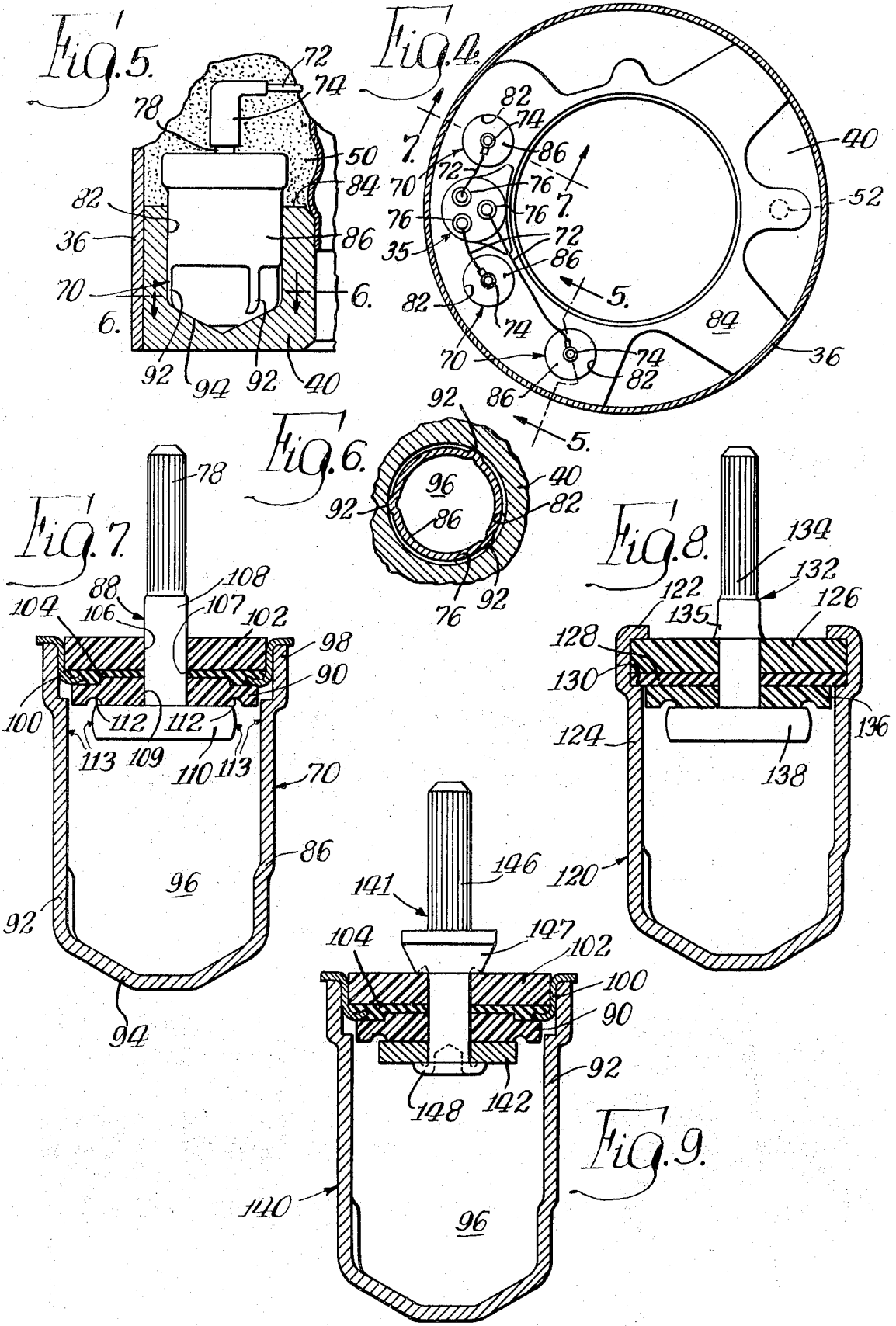

LIGHTNING ARRESTOR

Submersible electric motors for deep wells are subject to failure because of high voltage surges on power lines due to lightning. Lightning arrestors have been provided to protect such motors, and it has long been known that it is best to install the lightning arrestors close to the device being protected, particularly when the device being protected is a summersible electric motor since the housing of the motor is nearly perfectly grounded. Such an arrangement is shown in the A. T. Lyman, U.S. Pat. No. 3,435,290. The lightning arrestor shown in that patent is located externally of the motor, which is disadvantageous because it requires a separate liquid-tight housing with elaborate seals to prevent entry of well liquid into the arrestor. Such construction results in a more expensive arrestor because of the large arrestor housing. Further, it is difficult to locate such a large arrestor housing close to a motor within a well casing because the casing is generally about 4 inches in diameter, and it is necessary to locate the arrestor some distance away from the motor.

Another disadvantage of such an installation is that workmen improperly install or fail to install the lightning arrestor, resulting in failure of the motor.

The lightning arrestor of the present invention overcomes the aforementioned disadvantages by being located inside the motor and being grounded directly to the submerged housing of the motor. This construction has the advantage of using one liquid-tight housing for both the motor and the arrestor. The risk of improper installation has also been eliminated since the arrestor is installed during manufacture of the motor.

The lightning arrestor of the present invention comprises a closed arrestor casing connected to ground through the motor housing, the casing containing an electrode and a gas-generating material for extinguishing an arc created between the electrode and the casing. The casing of the arrestor forms a chamber of sufficient volume to contain the gas generated during several voltage surges.

Typically, the motor is located in a deep well which is usually from 100 to 1,000 feet in depth, and the motor is connected by power lines which are of a length approximately equal to the depth of the well. An important aspect of the present invention lies in the recognition that the length of the power lines limits the power follow-on current following the current surge caused by a lightning stroke to a relatively small value, for example on the order of 1,000 amperes, thus permitting the use of a small size arrestor. The small arrestor can be conveniently placed within the motor and connected to ground through the motor housing.

Objects and other advantages of the present invention will become apparent from the following description and the accompanying figures of the drawings, wherein:

FIG. 1 is a cross-sectional view of a well having a mpump and an electric motor installed therein, the motor including lightning arrestors embodying the present invention;

FIG. 2 is a schematic drawing of an electric circuit of the motor and lightning arrestors of FIG. 1;

FIG. 3 is a fragmentary cross-sectional view of the upper end portiom of the motor shown in FIG. 1;

FIG. 4 is a cross-sectional view taken along the line 4—4 of FIG. 3;

FIG. 5 is an enlarged fragmentary cross-sectional view taken along the line 5—5 of FIG. 4;

FIG. 6 is a cross-sectional view taken along the line 6—6 of FIG. 5;

FIG. 7 is a fragmentary enlarged cross-sectional view taken along the line 7—7 of FIG. 4;

FIG. 8 is a cross-sectional view of a second embodiment of lightning arrestor;

FIG. 9 is a cross-sectional view of a third embodiment of lightning arrestor; and FIG. 10 is a cross-sectional view of a fourth embodiment of lightning arrestor.

A well, normally a water well is illustrated in FIG. 1, and includes an outer casing 10 running the length of the well, or to bedrock about the bottom of the well. While the arrestor of the present invention is usable in a well of 30 feet or more in depth, it is particularly well suited to a well 50 feet or more in depth since at such depths a conventional above-ground arrestor installation does not provide sufficient protection. The well is filled with water to the level generally indicated by the numeral 14. Within the well is a submersible electric motor 16 and a pump 18. In this instance, the motor 16 is located below the pump 18, and the motor and pump are connected together to form a unit. The pump 18 has an inlet (not shown) which is located with its lower end below the water level 14, and an outlet which is connected to a discharge pipe 20. The pipe 20 extends upwardly through a discharge pipe opening 22 in a cap 12 to a point of use (not shown).

The motor 16 drives the pump 18 and is supplied with electrical energy from a source (not shown) by an electrical conduit 24 which leads into a conventional control box 26. A conduit 28 extends from the control box 26 down through an opening 30 in the cap 12 and terminates just below the cap. The electrical wiring from the end of the conduit 28 to the motor 16 is usually formed by a flexible plastic or rubber insulated drop cord 32. The lower end of the drop cord 32 terminates in a part 33 of an electrical connector which, in turn, plugs into a mating part 35 of the connector mounted on the motor 16.

The motor may be of the type described in the copending U.S. Pat. application, Ser. No. 187,012, filed Oct. 6, 1971, by E. J. Schaefer et al. and assigned to the assignee of the present application. As is shown in FIG. 3, the motor 16 comprises a sealed stator housing 34 providing a stator cavity 37 formed by an outer shell 36 and an inner liner 38. The cavity 37 is closed by two end rings 40 and 42 (FIG. 1) and contains stator windings 44, comprising a main winding 45, a start winding 46 (FIG. 2), and laminations 48. The windings 44 are held in place by a potting compound, generally indicated at 50. The end rings 40 and 42 (FIG. 1) which close the ends of the cavity 37 are welded to the shell 36 and liner 38. The motor 16 of course also includes a rotor (not shown). As is shown in FIG. 3, the electrical connector part 35 is mounted in a hole formed through the upper end ring 40. Bolt holes 52 (only one being shown) are provided in the upper end ring 40 to receive bolts fastening on an upper end bell (not shown).

A schematic diagram of the electric circuit for the motor 16 is shown in FIG. 2. In this instance, a single phase motor is illustrated, it being understood that the present invention could be incorporated in various types of motors, such as three-phase motors. Two power lines 54 and 56 having a potential of, for example, 230 volts across them are in the conduit 24 and lead into the control box 26, indicated in dashed lines in FIG. 2. Three long lines 58, 60 and 62 located in the conduit 28 and in the drop cord 32, lead from the control box 26 to the connector part 33. From the internal side of the electrical connector part 35, within the stator cavity 35, leads 64, 66 and 68 extend to the main winding 45 and to the start winding 46. As is indicated by 69, the motor housing is grounded by the water within the well.

As is shown in FIG. 2, three lightning arrestors 70 in accordance with the present invention are provided within the motor housing, each of the lightning arrestors 70 being connected by a short wire 72 to one of the wires 64, 66 and 68. As is better shown in FIGS. 4 and 5, one end of each of the wires 72 has a terminal 74 which connects to a mating terminal post 78 on a lightning arrestor 70. The other end of each of the wires 72 has a terminal 76 which connects to a mating terminal post 80 on the part 35 of the connector.

The arrestors 70 are relatively small in size, for example, excluding the terminal about one half inch in diameter and three quarters of an inch in length, and thus may be located within the motor which is usually less than four inches in diameter. Each lightning arrestor 70 fits within its own bore 82 (FIGS. 4 and 5) formed in the lower surface 84 (FIGS. 3–5) of the upper end ring 40.

As is better illustrated in FIG. 7, the lightning arrestor 70 comprises a casing 86, an electrode 88, and an arc extinguishing, gas-generating disc 90. The casing 86 provides a second electrode and is made of a conductive metal. The outer surface of the casing 86 of the arrestor 70 mechanically and electrically contacts the margin of the bore 82 to fasten and to ground the lightning arrestor to the motor housing 34. To facilitate such contact, the closed end of the casing 86 is crimped to provide three longitudinally extending external ribs 92, shown in FIGS. 5 and 6, and the end 94 of the casing 86 is formed at an angle corresponding to that generally formed by the end of a drill. The casing 86 forms a chamber 96 (FIG. 7) for a purpose hereinafter described. The open end of the casing 86 is enlarged as at 98, and a ring 100, similar in shape to the peripheral portion of a paint can lid and being generally "S" shaped in cross section, is provided to hold an insulating cap 102 to close the open end of the casing. An insulating seal 104 is provided below the cap 102 and is engaged by the ring 100. The gas-generating disc 90 in this instance is bone fiber, but other materials such as methyl methacrylate could also be used. The cap 102 is installed in the end of the casing 86 and is held in place against the ring 100 by a press or tight fit. The arrestor casing is thus sealed which is necessary to keep the potting material 50 from entering the chamber 96.

Openings 106, 107 and 109 are provided in the center of the cap 102, the seal 104 and the disc 90, respectively, and a stem 109 of the electrode 88 extends therethrough. An interference fit is preferably provided between the cap 102 and the stem 108. The stem 108 is splined at its outer end portion to form the terminal post 78 which receives the terminal 74. The inner end of the electrode 88 has an enlarged, integrally formed head 110 which extends radially outwardly from the stem toward the casing 86, but not in contact therewith. The gas-generating disc 90 is disposed between the head 110 of the electrode 88 and the cap 102. The portions of the gas-generating material 90 adjacent the electrode head 100 are cut asway as indicated at 112 (FIG. 7) to reduce the concentration of the electric field at the outer edge of the head 110 due to the high dielectric constant of the material of the disc 90, thereby providing a more reproducible flashover or breakdown voltage level. The spacing of a gap 113 formed between the outer edge of the head 110 and the inner surface of the casing 86 is, for a 230 volt motor, approximately .050 inch. Such a gap will withstand 1750 volts RMS, which is used when potential testing the windings, but will breakdown or flashover on surge voltages in excess of approximately 4000 volts.

Another embodiment of lightning arrestor, indicated at 120, is shown in FIG. 8 and is generally similar to the arrestor shown in FIG. 7 except that the outer edge 122 of the casing 124 is turned inwardly over a cap 126 and a seal 128. The cap 126 and the seal 128 are clamped between the inturned outer edge 122 and a shoulder 130 in the casing. The arrestor includes an electrode 132 which is generally similar to the electrode 88 shown in FIG. 6, but is different in that it has its stem 134 including an intermediate portion 135 which is upset or enlarged slightly just above the cap 126 to hold the cap 126, seal 128 and an arc extinguishing disc 136 between the portion 135 and an enlarged head 138 of the electrode. The remainder of the construction is similar to that of the arrestor shown in FIGS. 4 to 7.

Still another form of lightning arrestor 140 is shown in FIG. 9, and includes a casing, gas-generating material, seal, ring and cap similar to that shown in FIG. 7 and are therefore similarly numbered. The arrestor 140 includes an electrode 141 having an enlarged head 142 and a stem 146. The electrode 141 is different from the electrodes 88 and 132 in that the electrode head 142 is not integral with the stem 146, but is in the form of a separate disc. An intermediate portion 147 provided on the stem 146 is of a larger diameter than the rest of the stem, and the cap 102, the seal 104, the gas-generating disc 90 and the head 142 are held in place between the intermediate portion 147 and the rolled over inner end 148 of the stem 147.

Yet another embodiment of lightning arrestor, indicated at 150, is shown in FIG. 10, and includes an electrode 152, a gas-generating disc 154 and a cap 156. However, no separate casing is provided since the margin of a bore 158 in an end ring 160 forms a casing for the arrestor. The margin of the bore 158 also provides the second electrode for the arrestor. An O-ring seal 162 is provided between the bore 158 and the cap 156 to seal the cap to the bore.

The lightning arrestors in FIGS. 7–10 are all of the expulsion type, and their operation will be described with reference to the construction shown in FIG. 7. As shown in FIGS. 1 and 2, should a surge caused by lightning be induced in the power lines 54 and 56, the surge will travel down lines 58, 60 and 62, through the connector parts 33 and 35, through lines 64, 66 and 68, and through the lines 72 to the lightning arrestors 70. The voltage surge causes breakdown of the arrestor gaps 113, thus shorting the power lines to the motor housing 34 and therefore to ground. The arrestors 70 short the surge to ground before the windings 45 and 46 or the motor insulation are damaged. As previously mentioned, for a 230 volt motor, the gap 113 between the head 110 and the casing 86 of approximately .050 inches is preferred, the size of the gap being selected to permit the arrestor to withstand 1750 RMS volt potential testing but breaking down on a surge voltage in excess of 4000 volts peak.

Should power be provided to, for example, a 230 volt motor and a lightning surge occurs, the arrestor carries the initial surge. After this surge passes there is a follow-on current caused by the 230 volt line voltage. This follow-on current must be limited to a value of about 1000 amperes (RMS) or 1440 amperes (peak) which is generally the maximum current capacity of the arrestor. As shown in FIG. 2 when both arrestors break down, the current flows from one line through one arrestor to the housing through the other arrestor and to the other line so that the line voltage of 230 volts appears across this circuit. Each arrestor has a constant voltage drop of about 50 volts so that across both arrestors there is a total voltage drop of 100 volts.

Below are the calculations for the minimum well depth at which the 230 volt installation shown in FIG. 2 could be utilized:

1. The peak line voltage = 230 $\sqrt{2}$ volts = 325 volts

Neglecting other voltage drops,
2. The peak line voltage = $E$ (arrestors) + $E$ (drop cord)

Equating equations 1 and 2,
3. $E$ (arrestors) + $E$ (drop cord) = 325 volts
For two arrestors in series,
4. $E$ (arrestors) = 100 volts
Substituting from equation 4 into equation 3 and solving for $E$ (drop cord),
5. $E$ (drop cord) = 325 volts − 100 volts = 225 volts 6. Also, $E$ (drop cord) = $I$ (peak) × $R$ (drop cord)

7. $I$ (peak) = 1440 amperes
8. $R$ (drop cord) = $r \times L/1000$ ft.
  where L is the total length of the wires in the drop cord leading to and from the motor in feet
For a 230 volt installation,
9. $L$ = 2 × well depth in feet, and
  $r$ is the resistance of 1000 feet of wire in ohms, and for No. 14 copper wire
10. $r$ = 2,58 ohms
Substituting values from equations 7, 8, 9 and 10 into equation 6 and equating equation 5 to equation 6

11. 225 volts = (1440 amperes × 2.58 ohms × 2 × well depth)/1000 feet
Solving for well depth,
12. well depth = (225 × 1000)/(1440 × 2.58 × 2)
  well depth ≈ 30 ft.
Solving for $R$ of equation 8 using the value from equations 9, 10 and 12
13. $R$ = ($r$ × 2 × well depth)/1000 ft.
  $R$ = (2.58 ohms × 2 × 30 ft.)/1000 ft.
  $R$ ≈ .155 ohm As can be seen from the above calculations, the resistance of the long drop cord 32 containing the wires 58 or 60 and 62 and the constant 50 volt voltage drop across each arrestor will limit the follow-on current to a 1000 amperes or less, thus permitting the use of the small, sealed expulsion type arrestor described. For different size or type of wires used for the drop cord the minimum length of the drop cord will vary according to the above calculations with the resistance per 1000 feet of the wire. The above calculations can be modified for different type installations.

The limited amperage follow-on current will be extinguished since the heat of the arc in the gap 113 causes the arc extinguishing disc 90 to generate gas which is turbulently expelled into the gap 113. This turbulence cools the ionized gases in the gap and thus interrupts the arc at the next zero crossing of the AC line power. Thereafter, normal motor operation continues.

The size of the chamber 96 of the arrestor is large enough to accommodate gas generation for a plurality of lightning surges without the pressure therein becoming too great. A chamber having a volume of approximately one tenth of a cubic inch has been found to be satisfactory for at least 10 surges including the power follow-on currents of the surges.

A small lightning arrestor suitable for use within a submersible electric motor has been provided and comprises an electrode and gas generating, arc extinguishing material contained within a small sealed casing. The arrestor is connected to long power lines extending 30 feet or more from the motor, the long lines enabling the use of a small size lightning arrestor. The arrestor is grounded through the motor housing to the liquid in which the motor is submerged.

I claim

1. The combination of an electric motor including a grounded motor housing having an opening formed therein, power lines within said motor housing, at least one lightning arrestor mounted within said motor housing, said arrestor including a casing forming an electrode, said lightning arrestor being connected to one of said power lines and said arrestor casing being press fit into said opening to both establish electrical connection and to support said arrestor, said motor including a stator enclosure for a stator winding and potting material, said arrestor being located in said enclosure and being sealed to prevent entrance of said potting material.

2. The combination of an electric motor including a grounded motor housing having an opening formed therein, power lines within said motor housing, at least one lightning arrestor mounted within said motor housing, said arrestor including a casing forming an electrode, said lightning arrestor being connected to one of said power lines and said arrestor casing being press fit into said opening to both establish electrical connection and to support said arrestor, said lightning arrestor further comprising a sealed casing and a gas-generating material within said casing, said sealed casing forming a chamber for containing gas generated by said material.

3. The combination of claim 2, wherein said chamber has a volume sufficient to contain the gas generated by a plurality of arcs caused by lightning surges.

4. The combination of claim 3, wherein said chamber is generally one-tenth of a cubic inch in volume.

5. A submersible electric motor submerged in a deep well at a depth of at least 30 feet, comprising a motor housing connected to ground by the well liquid, windings within said housing, long power lines extending from the top of the well to said windings, at least one small expulsion type lightning arrestor mounted within said housing, said arrestor being sealed to form a gas receiving chamber and including an electrode connected to one of said power lines, said arrestor further including a second electrode grounded through said housing to the well liquid.

6. A motor as in claim 5, wherein said second electrode is formed by a casing which encloses the first electrode.

7. A motor as in claim 5, wherein said second electrode is formed by a part of said housing, said part having a bore formed therein which receives the first electrode.

8. A motor as in claim 5, wherein said long power lines and said arrestor have sufficient resistance to limit the follow-on current to 1000 amperes or less, and said chamber has a volume on the order of one tenth of a cubic inch.

9. A motor as in claim 8, wherein said arrestor has a constant voltage drop of at least 50 volts and said long power lines have a total resistance of at least .155 ohms.

* * * * *